(12) United States Patent
Kodesh et al.

(10) Patent No.: US 10,467,557 B1
(45) Date of Patent: Nov. 5, 2019

(54) METHOD AND SYSTEM FOR CLOUD SERVICES BUSINESS MANAGEMENT

(71) Applicant: EMC IP Holding Company LLC, Hopkinton, MA (US)

(72) Inventors: Harel Kodesh, Bellevue, WA (US); Ilia Gilderman, Bellevue, WA (US); Harinderpal S. Hanspal, Mercer Island, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 940 days.

(21) Appl. No.: 14/518,646

(22) Filed: Oct. 20, 2014

Related U.S. Application Data

(60) Provisional application No. 61/892,544, filed on Oct. 18, 2013.

(51) Int. Cl.
| | |
|---|---|
| *G06Q 10/06* | (2012.01) |
| *H04L 12/26* | (2006.01) |
| *G06F 9/50* | (2006.01) |
| *H04L 12/24* | (2006.01) |
| *H04L 29/08* | (2006.01) |

(52) U.S. Cl.
CPC ....... *G06Q 10/0631* (2013.01); *G06F 9/5072* (2013.01); *G06F 9/5088* (2013.01); *G06Q 10/06313* (2013.01); *H04L 41/0813* (2013.01); *H04L 43/04* (2013.01); *H04L 67/34* (2013.01)

(58) Field of Classification Search
CPC . G06F 9/5072; G06F 9/5088; H04L 41/0813; H04L 67/34
USPC ................................................ 705/7.23, 7.25
See application file for complete search history.

(56) References Cited

U.S. PATENT DOCUMENTS

| | | | | |
|---|---|---|---|---|
| 9,705,758 | B2* | 7/2017 | Anderson | H04L 41/5019 |
| 9,716,634 | B2* | 7/2017 | Sapuram | G06Q 30/0631 |
| 2012/0239739 | A1* | 9/2012 | Manglik | G06F 9/5077 |
| | | | | 709/203 |
| 2014/0279201 | A1* | 9/2014 | Iyoob | G06Q 30/0631 |
| | | | | 705/26.7 |
| 2014/0297835 | A1* | 10/2014 | Buys | H04L 43/0817 |
| | | | | 709/224 |
| 2015/0142786 | A1* | 5/2015 | Dawson | H04L 41/5003 |
| | | | | 707/723 |

* cited by examiner

*Primary Examiner* — Johnna R Loftis
(74) *Attorney, Agent, or Firm* — Ryan, Mason & Lewis, LLP

(57) ABSTRACT

Example embodiments of the present invention provide a method, a system, and a computer program product for cloud services business management. The method includes monitoring cloud services business metrics for a cloud services provider and analyzing the cloud services business metrics. Cloud services business parameters for the cloud services provider then may be acted upon according to the analyzed cloud services business metrics.

20 Claims, 24 Drawing Sheets

METHOD AND SYSTEM FOR CLOUD SERVICES BUSINESS MANAGEMENT

CROSS REFERENCE TO RELATED APPLICATION

This Application claims the benefit of U.S. Provisional Patent Application Ser. No. 61/892,544 entitled "METHOD AND SYSTEM FOR CLOUD SERVICES BUSINESS MANAGEMENT" filed on Oct. 18, 2013, the teachings of which application are hereby incorporated herein by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to cloud services business management, specifically methods and systems for monitoring and analyzing cloud services business metrics for a cloud services provider and acting on cloud services business parameters for the cloud services provider.

BACKGROUND

As it generally is known, "cloud computing" typically refers to the use of remotely hosted resources (e.g., hardware, applications, and software platform components) to provide services to customers over one or more networks, such as the Internet. Resources made available to customers typically are virtualized and dynamically scalable. Cloud computing services may include any specific type of application. Some cloud computing services are, for example, provided to customers through client software such as a Web browser. The software and data used to support cloud computing services are located on remote servers owned by a cloud computing service provider. Customers consuming services offered through a cloud computing platform need not own the physical infrastructure hosting the actual service and, accordingly, may avoid capital expenditure on hardware systems by paying, for example, for the service resources they use and/or a subscription fee. From a service provider's standpoint, the sharing of computing resources across multiple customers (i.e., tenants) improves resource utilization. Use of the cloud computing service model has been growing in popularity due to the increasing availability of high bandwidth communication, thereby making it possible to obtain response times from remotely hosted cloud-based services similar to those of locally-hosted services.

SUMMARY

Example embodiments of the present invention provide a method, a system, and a computer program product for cloud services business management. The method includes monitoring cloud services business metrics for a cloud services provider and analyzing the cloud services business metrics. Cloud services business parameters for the cloud services provider then may be acted upon according to the analyzed cloud services business metrics.

BRIEF DESCRIPTION OF THE DRAWINGS

The above and further advantages of the present invention may be better understood by referring to the following description taken into conjunction with the accompanying drawings in which.

DETAILED DESCRIPTION

Figure 1:
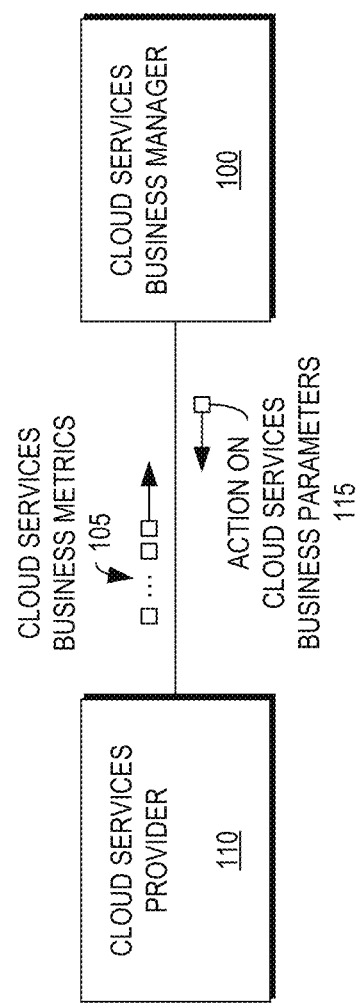
FIGS. 1 and 2 are block diagrams of a system, including a cloud services business manager for cloud services business management, according to example embodiments of the present invention.

Users face difficult business problems every day. Cloud computing adopts concepts from Service-oriented Architecture (SOA) that can help these users break their problems into services that can be integrated to provide a solution. Cloud computing provides its resources as services and makes use of the well-established standards and best practices gained in the domain of SOA to allow global and easy access to cloud services in a standardized way.

Cloud computing also leverages concepts from utility computing in order to provide metrics for the services used. Such metrics are at the core of public cloud pay-per-use models. In addition, measured services are an essential part of the feedback loop in autonomic computing, allowing services to scale on-demand and to perform automatic failure recovery.

The cloud business market is large, with the global public cloud service market expected to reach $206 billion by 2016. Cloud services companies need business management information to take actions that increase revenue and improve business metrics with a focus on well-defined products and services, targeted customer engagement, and revenue growth. However, traditional options are expensive and misaligned to cloud services businesses; they provide limited business management information, require expensive tools with complex integration, and are heavily laden with manual processes, thereby leading to misallocation of resources, limited visibility to customer needs and business metrics, and increased time-to-revenue.

It has been observed that the cloud services market has a large number of providers who do not have the resources to deploy custom business management systems. Therefore, such smaller players must specialize and focus on building their own services, and are looking to leverage third-party business management services to enable them to grow and compete with the larger cloud providers.

Example embodiments of the present invention may assist a wide range of cloud service providers, such as a company operating in the capacity as a cloud service provider or an enterprise IT organization providing IT cloud services internally. For example, for small cloud service providers (e.g., MongoHQ and Blower.io) which typically provide Software as a Service (SaaS), example embodiments of the present invention may assist those small cloud service providers focus on their products and reduce time-to-revenue (i.e., the amount of time before the cloud service providers recognize revenue from its customers). Similarly, for growing cloud service providers (e.g., Mozy and Medio) which typically provide SaaS and Platform as a Service (PaaS), example embodiments of the present invention may assist those growing cloud service providers not only focus on their products and reduce time-to-revenue but also reduce total cost of operations (TCO) and sell solutions that are comprised of multiple products from multiple sources, all of which need to be monitored and managed. Further, for established cloud service providers (e.g., VMware, HP, Telstra, and Rackspace) which typically provide SaaS, PaaS, and Infrastructure as a Service (IaaS), example embodiments of the present invention may assist those established cloud service providers not only focus on their products, reduce time-to-revenue, reduce TCO, and sell solutions but also grow their ecosystem, build marketplaces for other service providers, and help develop business model innovation.

FIG. 1 is a block diagram of a system, including a cloud services business manager 100 for cloud services business management, according to an example embodiment of the present invention. The cloud services business manager 100 may monitor cloud services business metrics 105 for the cloud services provider 110 and analyze the cloud services business metrics 105. According to the analyzed cloud services business metrics 105, the cloud services business manager 100 then may act on cloud services business parameters 115 for the cloud services provider 110.

Figure 2:
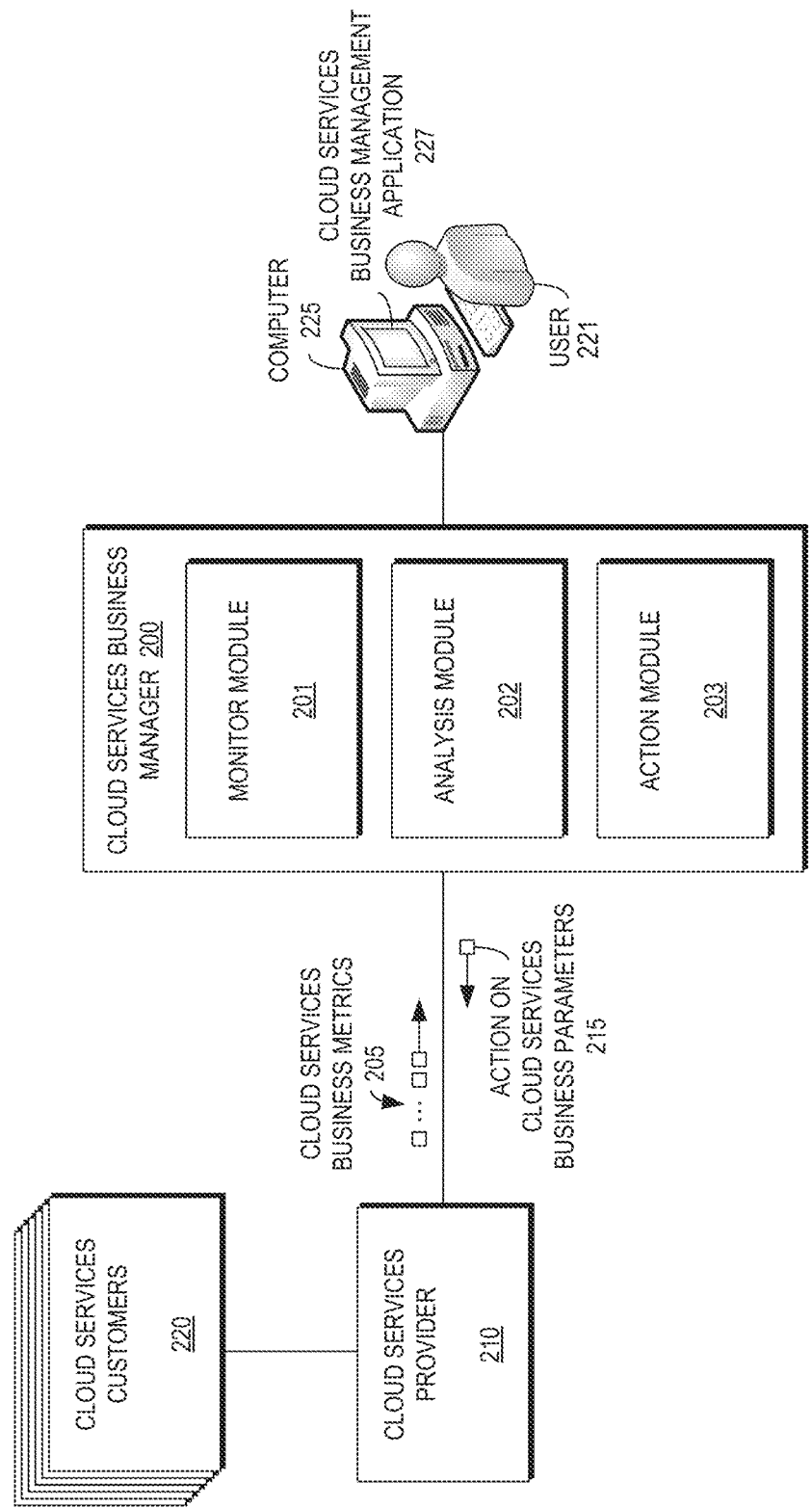

FIG. 2 is a block diagram of a system, including a cloud services business manager 200 for cloud services business management including a monitor module 201, an analysis module 202, and an action module 203, according to an example embodiment of the present invention. As understood in the art, a cloud service provider 210 may provide cloud services to cloud services customers 220 (i.e., tenants). The provision of cloud services by the cloud service provider 210 to the cloud services customers 220 generates cloud services business metrics 205. The cloud service provider 210 may provide its cloud services business metrics 205 to the cloud services business manager 200 via, for example, an Application Programming Interface (API) or any other interface suitable for these purposes.

As illustrated in FIG. 2, the cloud services business manager 200 may provide a cloud services business management application 227. Therefore, a user 221 of a computer 225 may operate the cloud services business management application 227 to control the cloud services business manager 200. The cloud services business management application 227 may provide online business management services for cloud services providers 210 and enable cloud services providers 210 to use sophisticated metrics for cloud business management to be more agile, capital efficient, and responsive so they can grow more efficiently and profitably by focusing on subscribers, revenue, and customer management. In certain embodiments, the cloud services business management application 227 may receive information from the cloud services provider 210, such as information from cloud services customers 220 acquisition record (e.g., purchase of the service, provisioning, Terms of Service (TOS) agreement) and from usage events that are logged as part billing the customers 220.

Figure 4A:
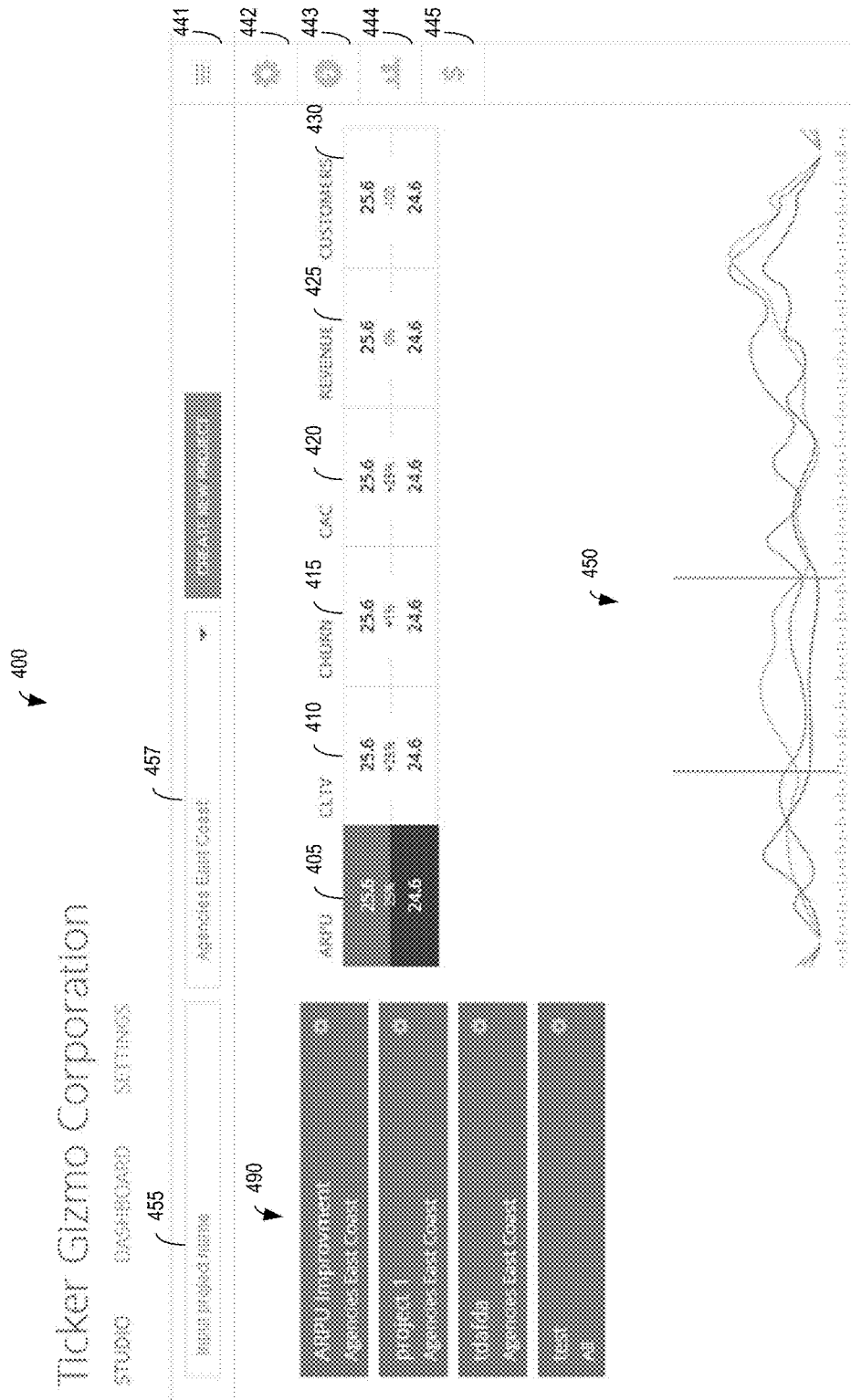
FIGS. 4A-4J are screenshots of a cloud services business management application studio for creating projects to act on cloud services business parameters according to example embodiments of the present invention.
Figure 4B:
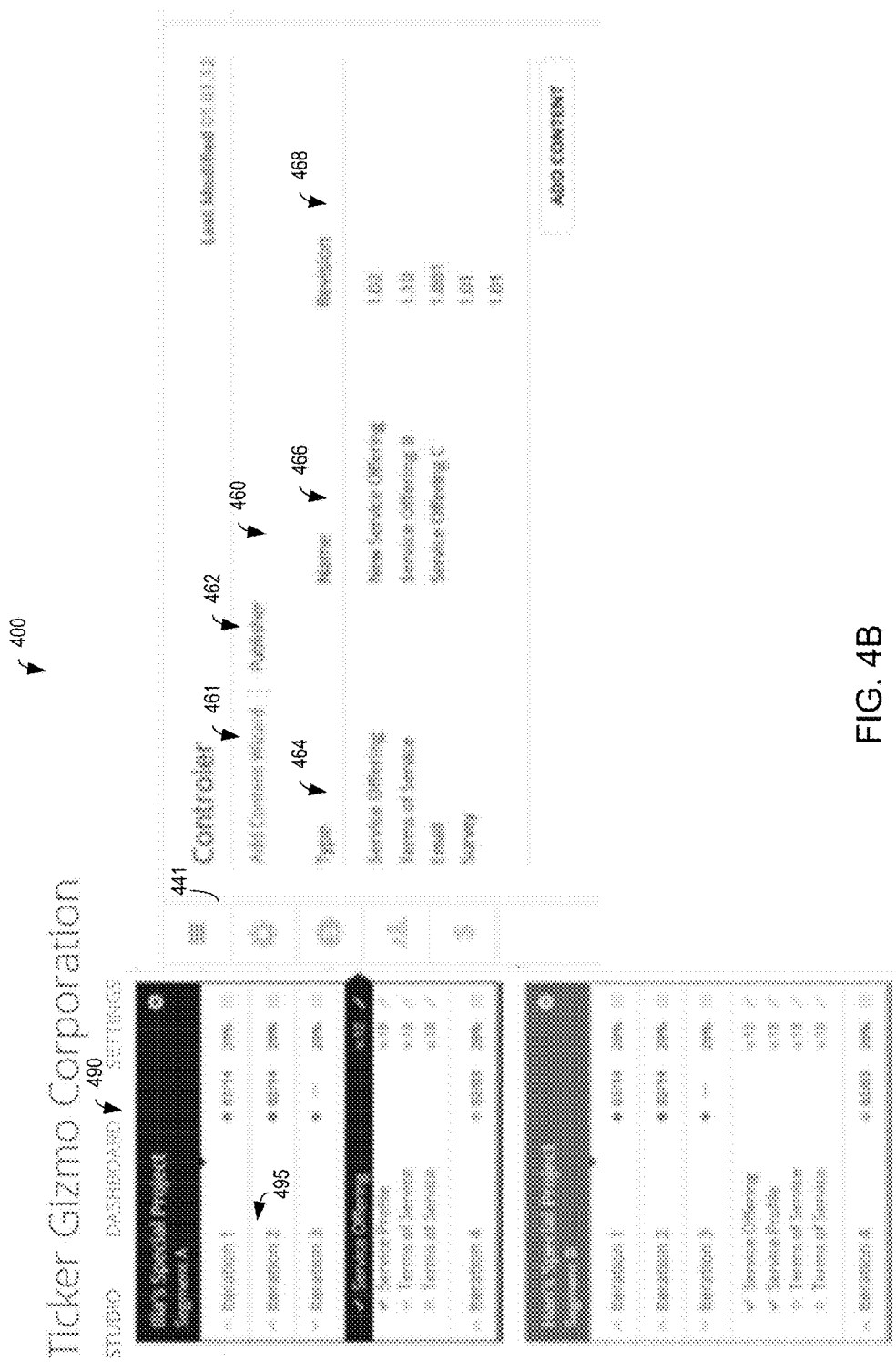
Figure 4C:
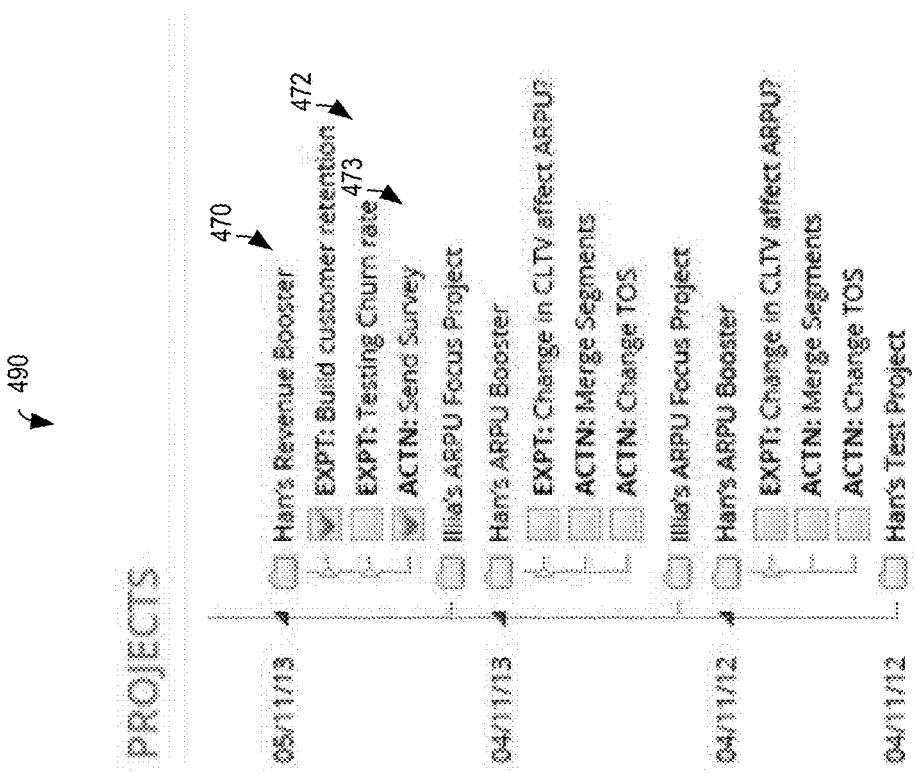
Figure 4D:
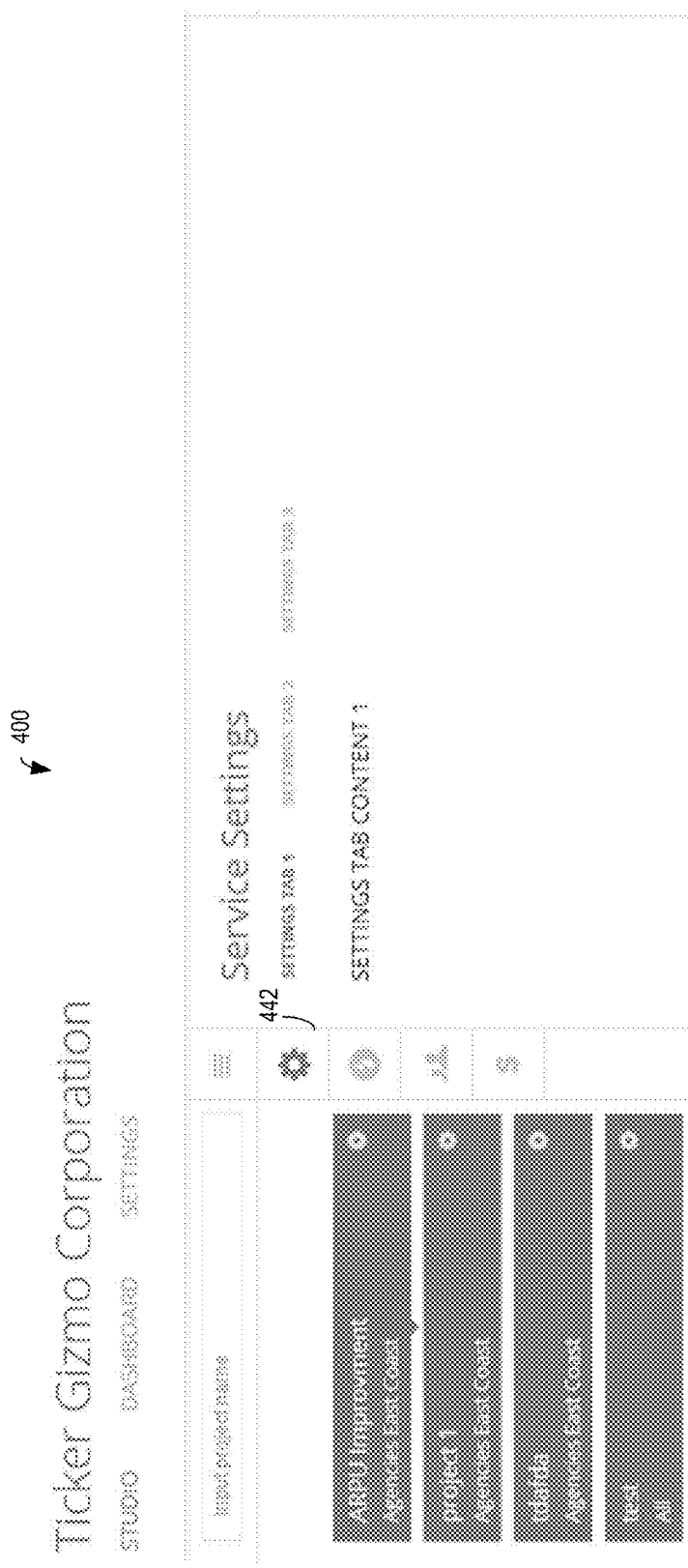
Figure 4E:
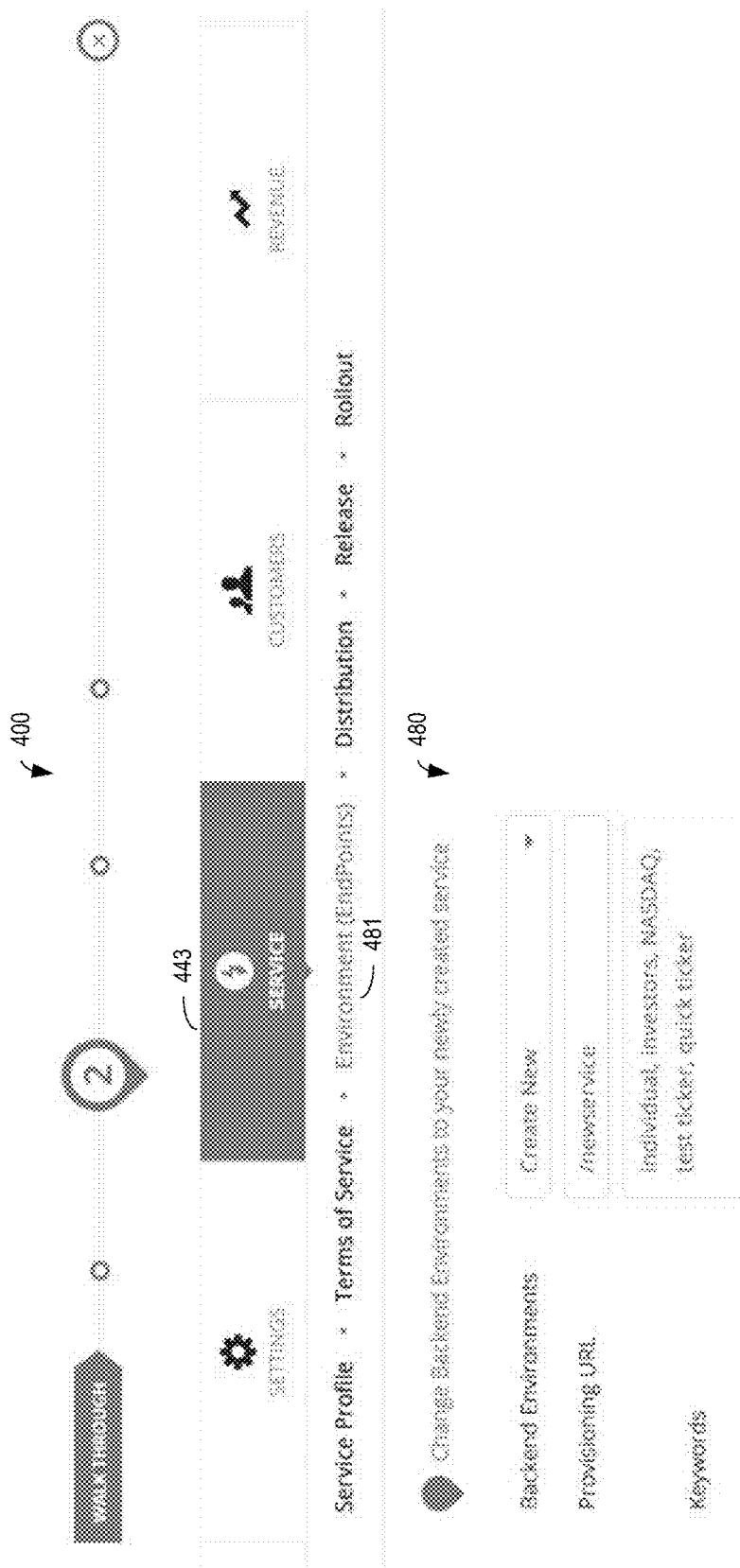
Figure 4F:
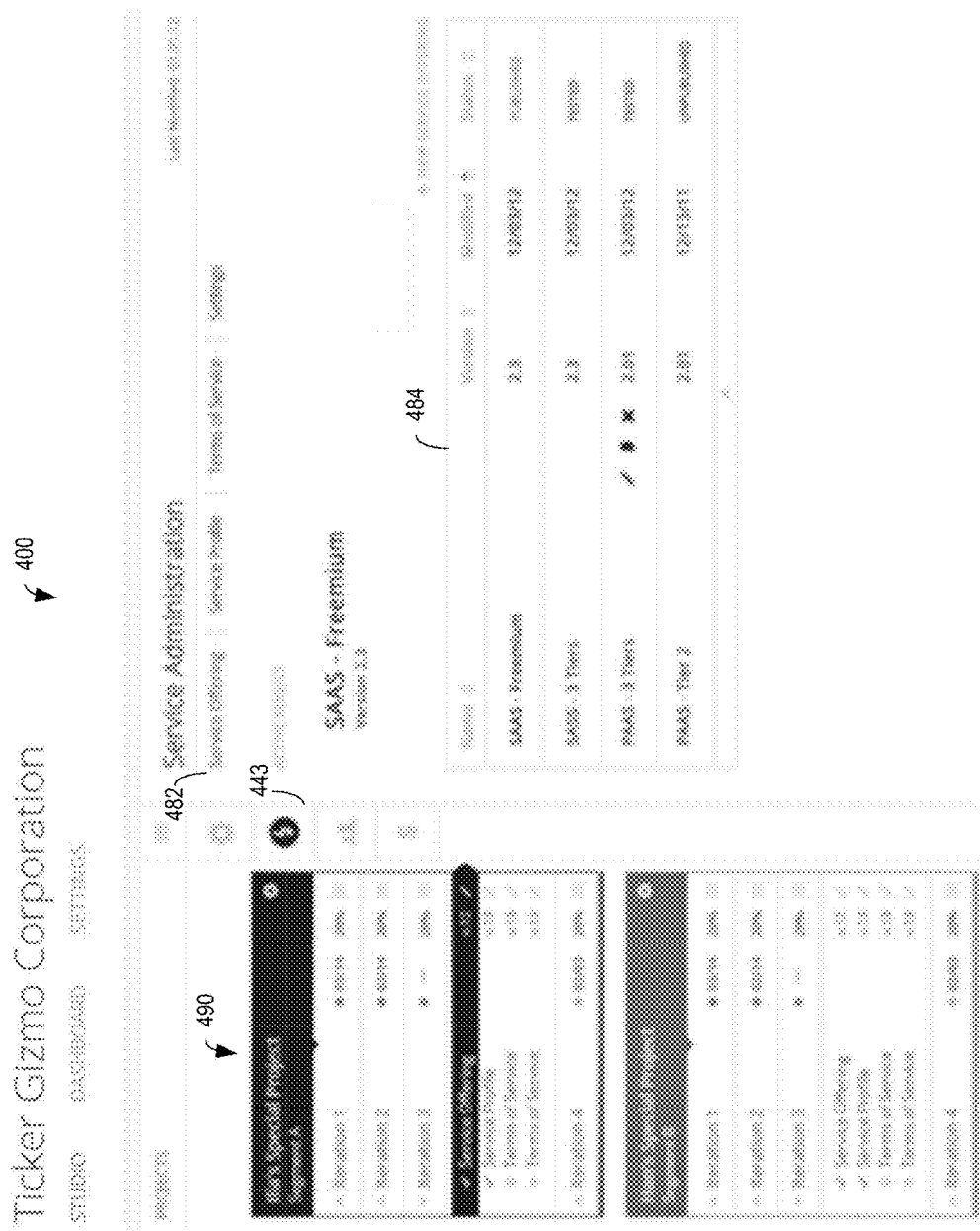
Figure 4G:
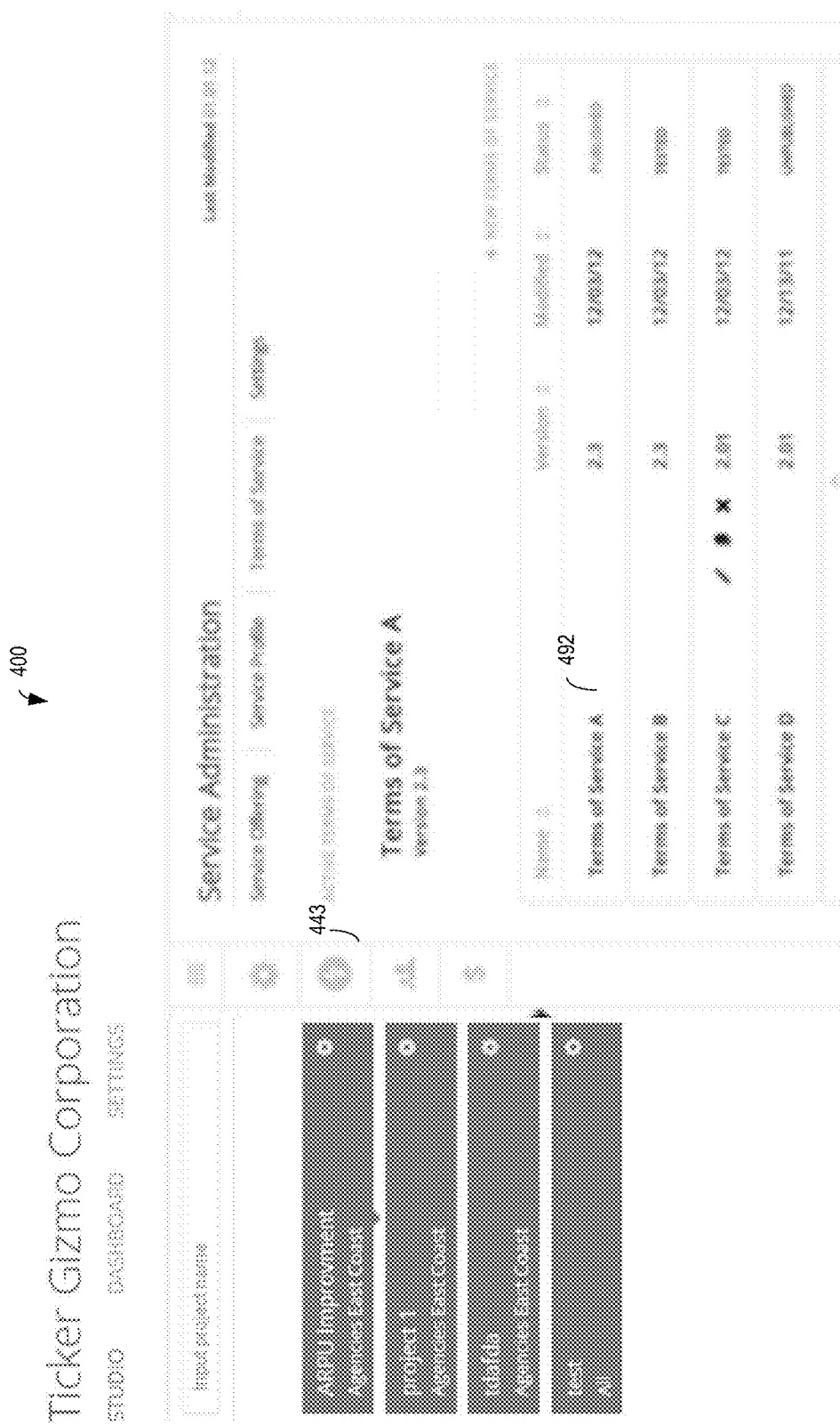
Figure 4H:
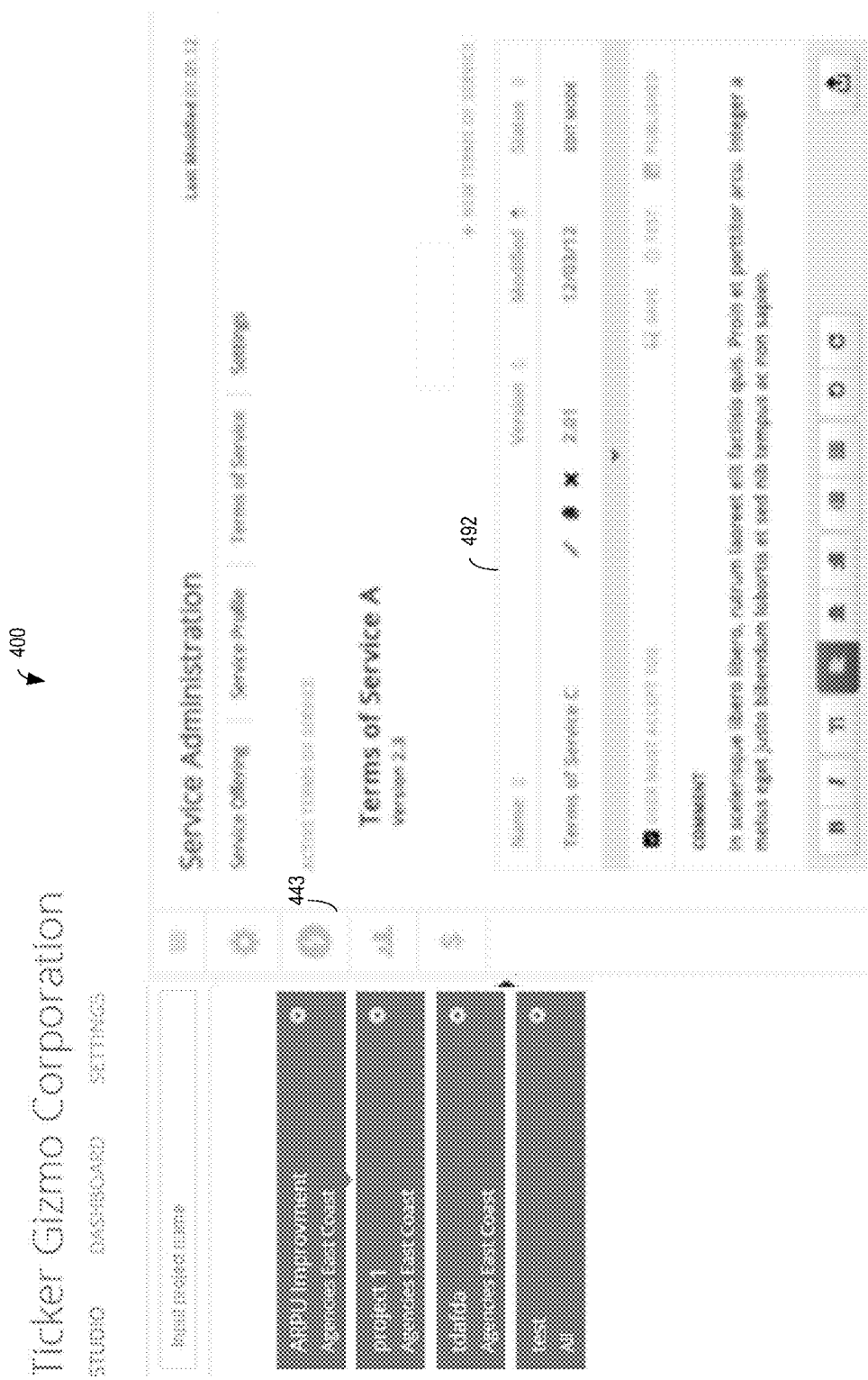
Figure 4I:
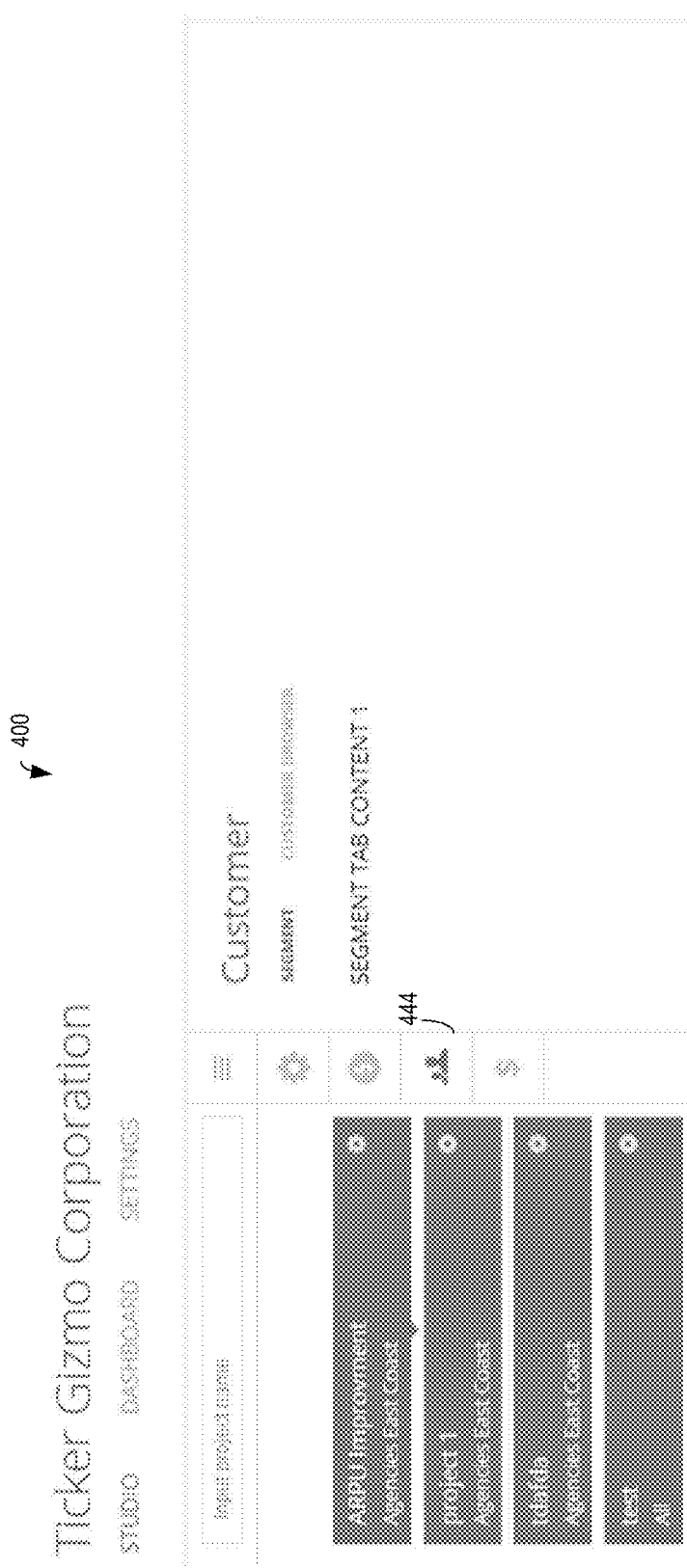
Figure 4J:
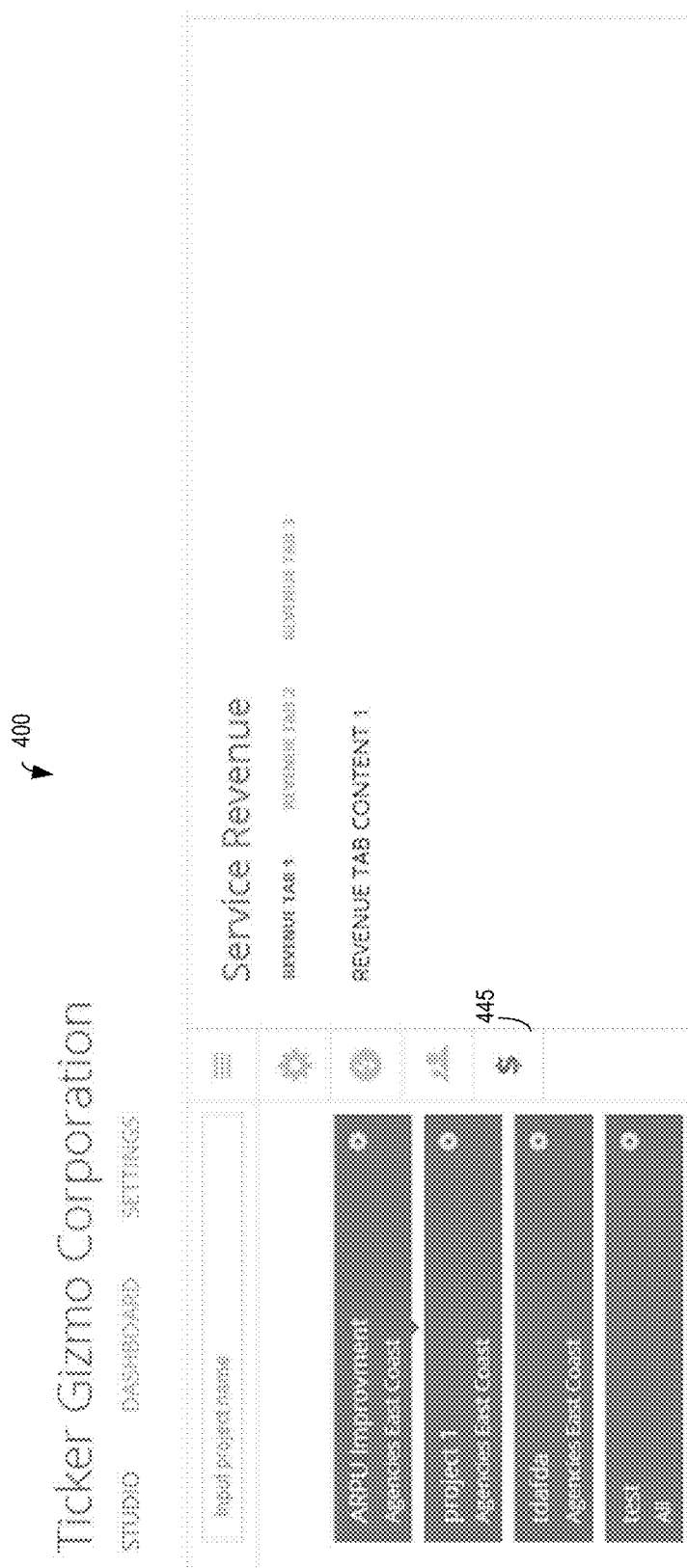
Figure 5:
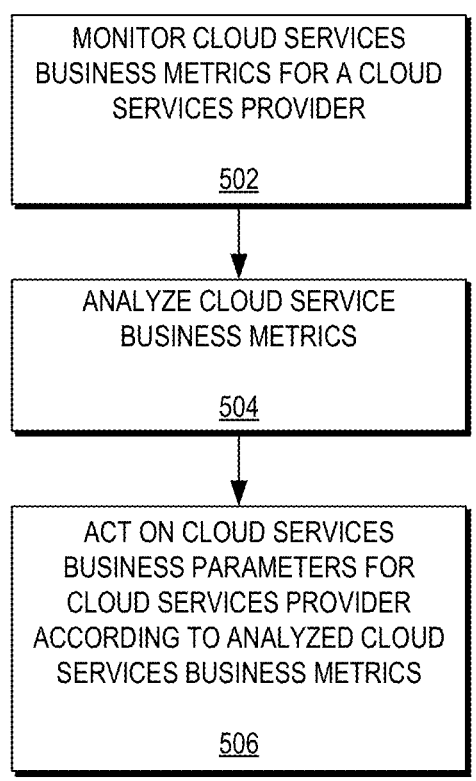
FIG. 5 is a flow diagram illustrating a method for cloud services business management according to an example embodiment of the present invention.

FIG. 2 may be studied in conjunction with FIG. 5 which is a flow diagram of a method according to an example embodiment of the present invention. As illustrated in FIGS. 2 and 5, and as will be described in greater detail below with respect to FIGS. 3A-3F and 6, the monitor module 201 may monitor the cloud services business metrics 205 for the cloud services provider 210 (502) and the analysis module 202 may analyze the cloud services business metrics 205 (504). According to the analyzed cloud services business metrics 205, and as will be described in greater detail below with respect to FIGS. 4A-4J, 7, and 8, the action module 203 then may act on cloud services business parameters 215 for the cloud services provider 210 (506). It should be understood that the method of FIG. 5 may be performed repeatedly with feedback generated from acting on cloud services business parameters 215 for the cloud services provider 210 (506) provided for additional monitoring of cloud services business metrics 205 for the cloud services provider 210 (502).

FIGS. 3A-3F are screenshots of a cloud services business management application (e.g., cloud services business management application 227 of FIG. 2) dashboard 300 enabling measurement of the success of respective cloud services business metrics 305, 310, 315, 320, 325, 330 for a cloud services provider (e.g., cloud services provider 210 of FIG. 2) for monitoring and analysis of the cloud services business metrics (e.g., cloud services business metrics 205 of FIG. 2) according to example embodiments of the present invention. FIGS. 3A-3F depict, for a selected cloud services business segment 385 over a range of time, respective plots 355, 360, 365, 370, 375, 380 in a graph region 350 of the dashboard 300 of Average Revenue Per User (ARPU) 305, Customer Lifetime Value (CLTV) 310 (based on ARPU and churn), Churn 315 (i.e., customer turnover rate), Customer Acquisition Cost (CAC) 320 (i.e., the cost of getting a customer; should be less than CLTV), Revenue 325, and Customers 330, respectively.

Figure 6:
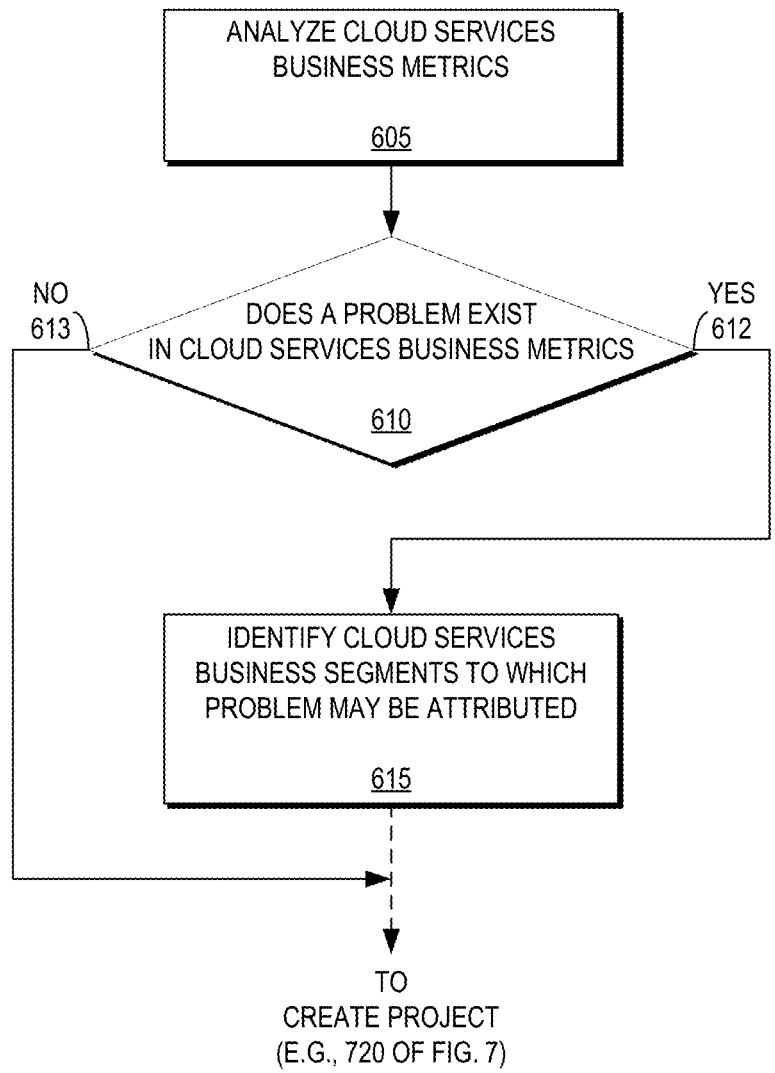
FIG. 6 is a flow diagram illustrating a method for identifying cloud services business segments to which a problem identified in cloud services business metrics may be attributed for creation of a project to act on the cloud services business parameters according to an example embodiment of the present invention.

The screenshots of FIGS. 3A-3F of a cloud services business management application dashboard 300 may be studied in conjunction with the flow diagram of FIG. 6 illustrating a method for cloud services business management and a method for identifying cloud services business segments to which a problem identified in cloud services business metrics may be attributed for creation of a project to act on the cloud services business parameters according to an example embodiment of the present invention. The cloud services business management application typically presents the dashboard 300 for a business management function (e.g., Finance or Marketing) at the cloud services provider to analyze cloud service business metrics (605).

For example, the cloud services provider may analyze ARPU 305, CLTV 310, Churn 315, CAC 320, Revenue 325, and Customers 330 and their respective plots 355, 360, 365, 370, 375, 380 as illustrated in FIGS. 3A-3F. The plots 355, 360, 365, 370, 375, 380 can track multiple metrics according to multiple business segments 385 and offer a way to see what action is being taken and, as will be described in greater detail below, provide techniques to invoke pre-defined and custom actions to remedy any adverse trend observed on the curve.

Additionally, the dashboard 300 allows the cloud services business management application user to take actions on cloud services business segments and add notes regarding those actions. The cloud services provider may analyze historical actions taken on the cloud services business and notes made in a history region 390 of the dashboard 300. It should be noted that notes may be added to any piece of information capable of being displayed on the dashboard 300 or in the studio 400. For example, notes may be attached to an iteration, described in greater detail below, or a location in a plot so the user can identify similar effects noticed in cloud services business metrics and apply content previously noted to have a particular effect.

Figure 3A:
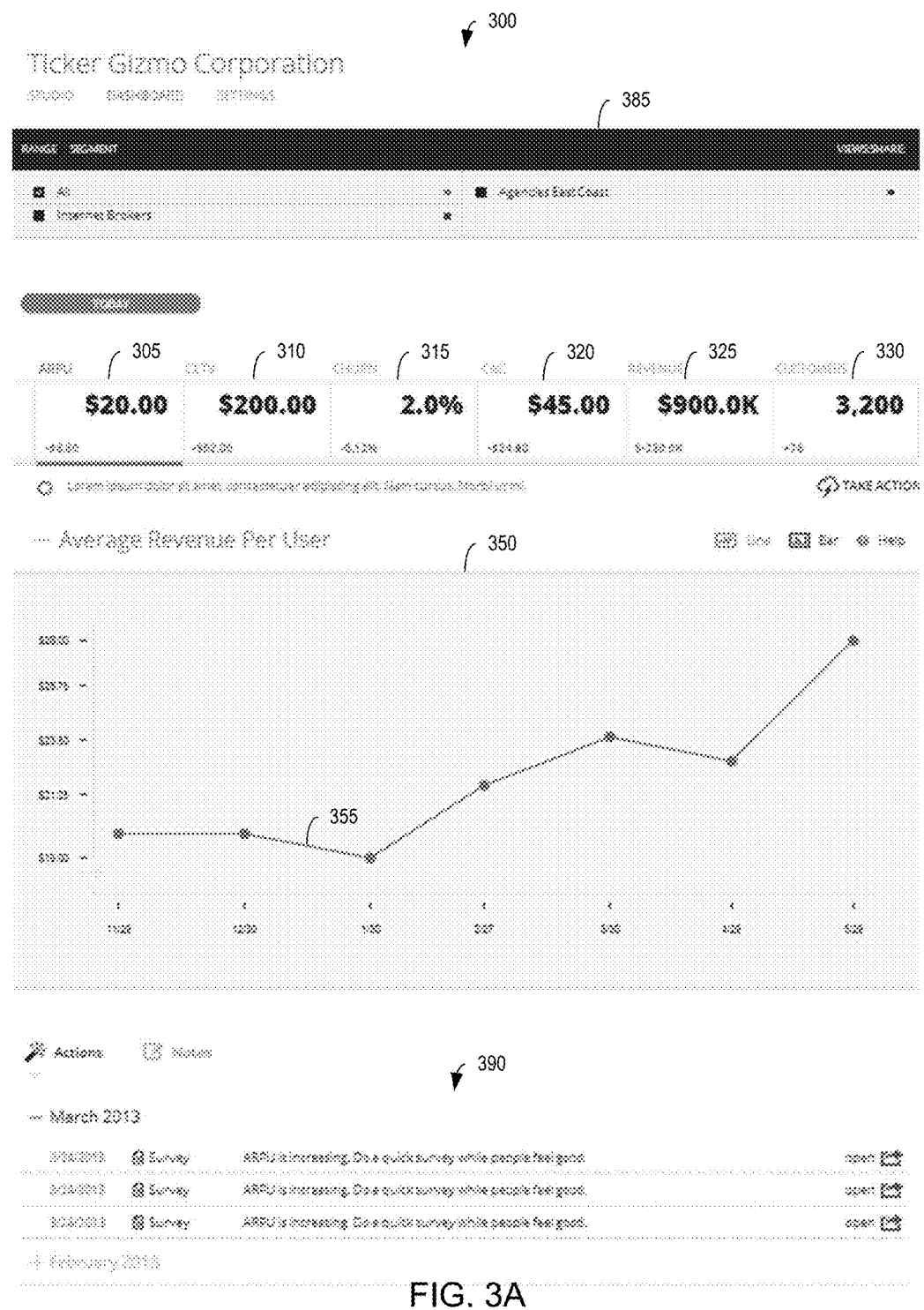
FIGS. 3A-3F are screenshots of a cloud services business management application dashboard displaying respective cloud services business metrics for a cloud services provider for monitoring and analysis of the cloud services business metrics according to example embodiments of the present invention.
Figure 3B:
Figure 3C:

The cloud services business management application user, by employing the cloud services business manager, then may determine whether there is a problem in the cloud services business metrics (610). In other words, does the analysis of the cloud services business metrics indicate that operation of the cloud services business is in some way sub-optimal or subject to improvement? For example, if one of the metrics illustrated in FIGS. 3A-3F is not trending in the right direction (e.g., ARPU in FIG. 3A is going down, CLTV in FIG. 3B is going down, Churn in FIG. 3C is going up, CAC in FIG. 3D is going up, Revenue in FIG. 3E is going down, and Customers in FIG. 3F is going down), it would be desirable for the cloud services provider to determine the cause of the change in cloud services business metrics and make changes to the cloud services business parameters to cause a change in the observed cloud services business metrics.

Figure 3D:
Figure 3E:
Figure 3F:

For example, as illustrated in FIG. 3D, CAC 370 is steeply trending upward, which is a negative cloud services indicator. Therefore, when there is a problem with one or more cloud services business metrics (612), the dashboard 300 enables the cloud services business management application user to identify cloud services business segments 385 to which the identified problem may be attributed (615) so that segment of the cloud services provider's business may be addressed to rectify the problem. Accordingly, a cloud services business management application user may study the plot 370 of CAC for various segments 385 (and combinations thereof) to identify segments of the cloud services provider's customer base that are causing the negative effect on the cloud services business metrics (e.g., a certain segment of the customer base is migrating from a high price plan to a lower price plan thereby reducing ARPU, CLTV, and Revenue).

It should be understood that segments may be defined manually or created arbitrarily according to customer data and the segment 385 may be any portion of the cloud services business's customer base selected according to some customer attribute. For example, the selected segment 385 may be "All", "Internet Brokers", or "Agencies East Coast". It should be understood that a combination of segments may be selected for display in the plot 355, 360, 365, 370, 375, 380. Similarly, review of metrics may be performed manually or automatically according to the metrics displayed on the dashboard 300. In certain embodiments, automation may automatically determine a segment that is causing an effect, such as based on a policy.

However, the cloud services provider may want to change the cloud service business parameters even if there is no problem in the cloud services business metrics (613) (e.g., rolling out a new feature, testing iterations for a feature, making an announcement about an outage, or setting aggressive goals and managing the business metrics according to these goals). For example, as illustrated in FIG. 3A, ARPU 355 generally is trending upward, which is a positive cloud services indicator. However, it may be desirable for the cloud services business provider to study actions in the history region 390 that were taken around the "1/30" and "4/29" plot points to determine whether those actions may have caused the negative effect on ARPU. Likewise, while CLTV 360 generally is trending upward in FIG. 3B, which is a positive cloud services business indicator, it may be beneficial to the cloud services provider to determine the cause of the decrease in CLTV around the "4/29" plot point. Further, FIG. 3C shows Churn 365 generally trending downward with the exception being around the "3/30" plot point; thus, it may be beneficial to the cloud service provider to determine the cause of customer loss. Moreover, FIGS. 3E and 3F show positive cloud service indicators of steady, consistent growth in Revenue 375 and Customers 380.

Figure 7:
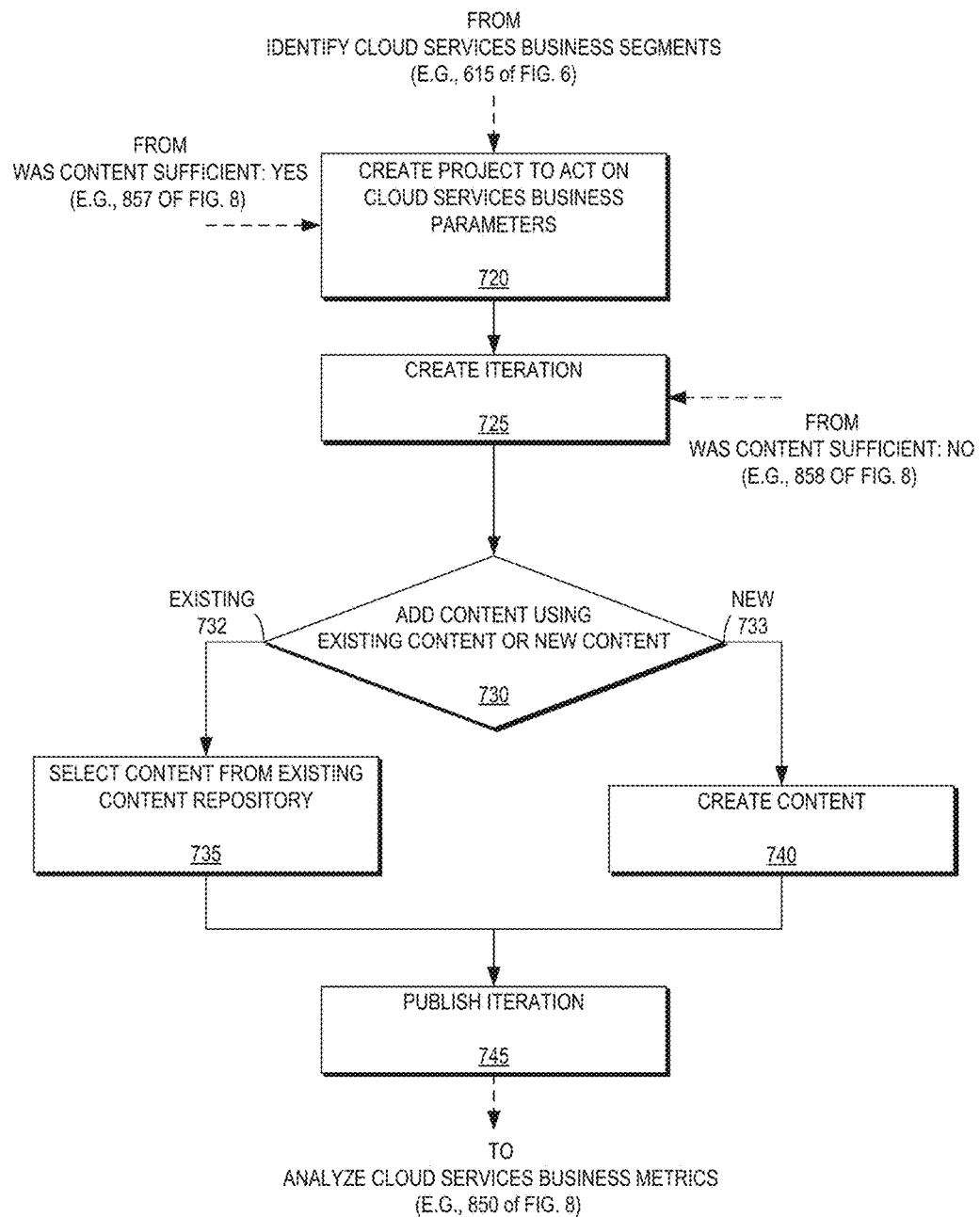
FIG. 7 is a flow diagram illustrating a method for creating a project to act on cloud services business parameters for iteration according to an example embodiment of the present invention.

FIGS. 4A-4J are screenshots of a cloud services business management application (e.g., cloud services business management application 227 of FIG. 2) studio 400 for creating projects to act on cloud services business parameters according to example embodiments of the present invention. The screenshots of FIGS. 4A-4J of a cloud services business management application studio 400 may be studied in conjunction with the flow diagram of FIG. 7 illustrating a method for creating a project to act on cloud services business parameters for iteration according to an example embodiment of the present invention.

Once the segments (e.g., segments 385 of FIGS. 3A-3F) have been identified to which the cloud services business problem may be attributed (which allows the cloud services business management application user to identify customers that are causing the effect), the cloud services business management application user will be directed to the studio 400, as illustrated in FIG. 4A, to determine how to address the effect (e.g., reduce CAC). As illustrated in FIG. 4A, the studio 400 provides much of the information provided by the dashboard 300, such as cloud services business metrics 405, 410, 415, 420, 425, 430 and a graph area 450 for displaying plots of metrics.

Accordingly, the user may create a project 455 (or select a predefined project 490) to act on cloud services business parameter (720) for an identified segment 457 (e.g., improve ARPU for Latin American customers). As described above, the project may be iterative, meaning that the user may take various actions on various segments to determine respective effects caused by those actions on the acted-upon segments. As described in greater detail below with respect to FIGS. 4B-4J, Controller 441, Service Settings 442, Service Administration 443, Customer 444, and Service Revenue 445 studio panes provide tools to help the user mitigate the problem determined from analyzing the cloud services business metrics. Accordingly, the user may create an iteration (725) within the project 490 and assign a portion of the segment 385 to it for action. The iterations allow the user to optimize the cloud services business metrics through successive refinement of content. The main objective of refinement is to get optimal services offering to the customer.

As illustrated in FIG. 4B, the user then may add content to the iteration 495 (730) in the Controller pane 441. In certain embodiments, content may be any piece of data pertinent to the project, such as a Service Offering (e.g., sending out a new price plan), Terms Of Service, Email, Survey, other customer-touching materials). Content may be selected from a repository of existing content 460 (732), selected for example according to type 464, name 466, and revision 468, or the user may create new content (733), such as via a wizard 461. If the user chooses existing content (732), the user may select content from the existing content repository (735). Likewise, if the user chooses to create new content, the studio 400 helps the user create content (740) (e.g., Add Content Wizard 461). Once the content is selected (735) or created (740), the user may publish 462 the iteration (745), including its content.

As illustrated in FIG. 4C which is a screenshot of a Project pane 490 in the studio 400 according to an example embodiment of the present invention, in each iteration, multiple types and versions of content may be made available to the entire segment or certain subsets of it. For example, the project-based approach to iterate on business models supports multiple approaches to revenue generation. As illustrated in FIG. 4C, each project 470 may have a plurality of expectations 472 and a number of actions 473 for achieving those expectations.

For example, suppose a group of users is identified as causing a problem in ARPU (e.g., ARPU is going down as customers switch from a $10 plan to a $5 plan). The cloud services business management application user's goal is to figure out a plan that will fix the problem. The user may come up with multiple plans (i.e., projects), one of which may be to create a $7 plan. However, the user needs to figure out what that $7 plan should be, including the Terms of Service. Accordingly, the user may create various pieces of content, such as surveys, for inclusion as content in respective iterations. With each iteration, the user may target a subset of the identified segment and test the plan out by presenting the plan to see what type of behavior is triggered. The user then may keep iterating until a desired goal is achieved in the cloud services business metrics from manipulating the cloud services business attributes increasing ARPU. Therefore, iterations may be considered a kind of real-time modeling where a real-world reaction is observed.

FIG. 4D is a screenshot of a Service Settings pane 442 of the Studio 400 describing the environment of a cloud service provider offered service (i.e., If a customer signs up for the cloud service provider's service, how does the cloud service provider provide the service?) It includes and allows the user to define parameters such as the description of the service, the location of the various environments (e.g., production, testing, staging), as well as the various projects the user wants to initiate to improve or study some of the metrics the system is monitoring.

FIGS. 4E-4F are screenshots of a Service Administration pane 443 in which the cloud services business management application user may manage the cloud service. For example, as illustrated in FIG. 4E, the user may create and change backend environments for a service 480 via an Environment tab 481. Likewise, as illustrated in FIG. 4F, the user may define a Service Offering 484 via a Service Offering tab 482. In certain embodiments, the Service offering 484 may include features of the service and the plan price.

FIGS. 4G-4H are screenshots of a Service Administration pane 443 displaying Terms of Service browser and edit modes, respectively, according to example embodiments of the present invention. The Terms of Service 492 may include a name, a version number, a date of modification, a status, and the text of the Terms. The Terms of Service modes allow a user to select a terms of service 492 for inclusion as content in an iteration and define and edit a terms of service 492 to be used as content.

FIG. 4I is a screenshot of a Customer pane 444 according to an example embodiment of the present invention with which a cloud services business management application user may manage customers, including drilling down a composition of a segment into subsegments or even an individual customer record. For example, the user may browse, within the "East Coast agencies" all those Agencies that have signed up to the service in the last three months, or even look at a specific agency.

FIG. 4J is a screenshot of a Service Revenue pane 445 according to an example embodiment of the present invention. This tab allows a user to look at the revenue history of the selected segment.

Figure 8:
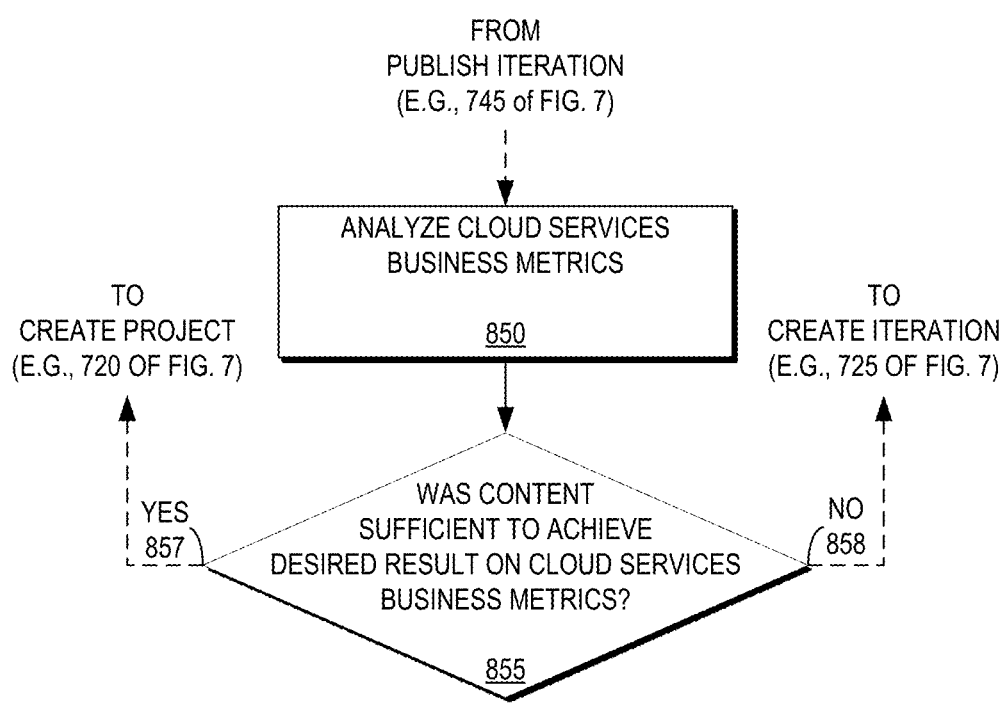
FIG. 8 is a flow diagram illustrating a method for analyzing cloud services business metrics resulting from acting on cloud services business parameters to determine whether the action was sufficient according to an example embodiment of the present invention.

FIG. 8 is a flow diagram illustrating a method of analyzing cloud services business metrics (850) resulting from acting on cloud services business parameters and determining whether the action was sufficient (855) according to an example embodiment of the present invention. In other words, the cloud services business management application user may, again, analyze cloud services business metrics (850) after taking some action on the cloud services parameters in an iteration to determine whether the content was "good enough" to achieve the desired goal. As described above with respect to FIG. 4C, each project should have at least one expectation (i.e., a goal). Therefore, in determining whether the content was "good enough", the cloud services business management application user may determine whether the cloud services business metrics are indicative of having met the expectation. If the content was sufficient (857), the cloud services business management application user may subject additional customers (i.e., another subset of the segment) that were not part of the project to the same content and create a new project (e.g., 720 of FIG. 7). However, if the content was not sufficient (858), the cloud services business management application user may create a new iteration (e.g., 725 of FIG. 7) with new content.

It should be understood that example embodiments of the present invention may assist cloud service providers with services provided by example embodiments of the present invention and external services, such as:

customer management (e.g., help desk, community and knowledge base, organizational structure, roles, and invitations, "freemium/free trial" management, multiple subscription accounts, surveys and newsletters, sales force automation, customer hierarchy, spending limits, referral management, cross-CSP support, marketing automation, and advanced marketplace (e.g., task-based bundles, vertical marketplaces));

service management (e.g., revenue models (e.g., metered, auction, reserve), usage collection and rating, price plan templates (e.g., SaaS, PaaS/IaaS), multi-service/marketplace, ratings and reviews, partner onboarding, bundles (e.g., basic, smart), affiliate management, provisioning/usage (e.g., PaaS, IaaS), third party distribution automation, and service assurance);

revenue management (e.g., revenue recognition, taxes (e.g., external integration, manual, categories, exemption), fraud detection and prevention, revenue modeling, re-seller billing, partner settlement (e.g., incoming and marketplace payouts));
  core services (e.g., recommendation engine);
  dashboard (e.g., feature engagement score, account engagement score, Net Promoter Score (NPS), cost-to-serve, customer acquisition cost (CAC));
  studio; and
  connectors (e.g., UserVoice, Amazon Web Services (AWS), SurveyGizmo, Aria, Zuora, Salesforce.com, Zendesk, CyberSource, Apptio, Rightscale).

Figure 9:
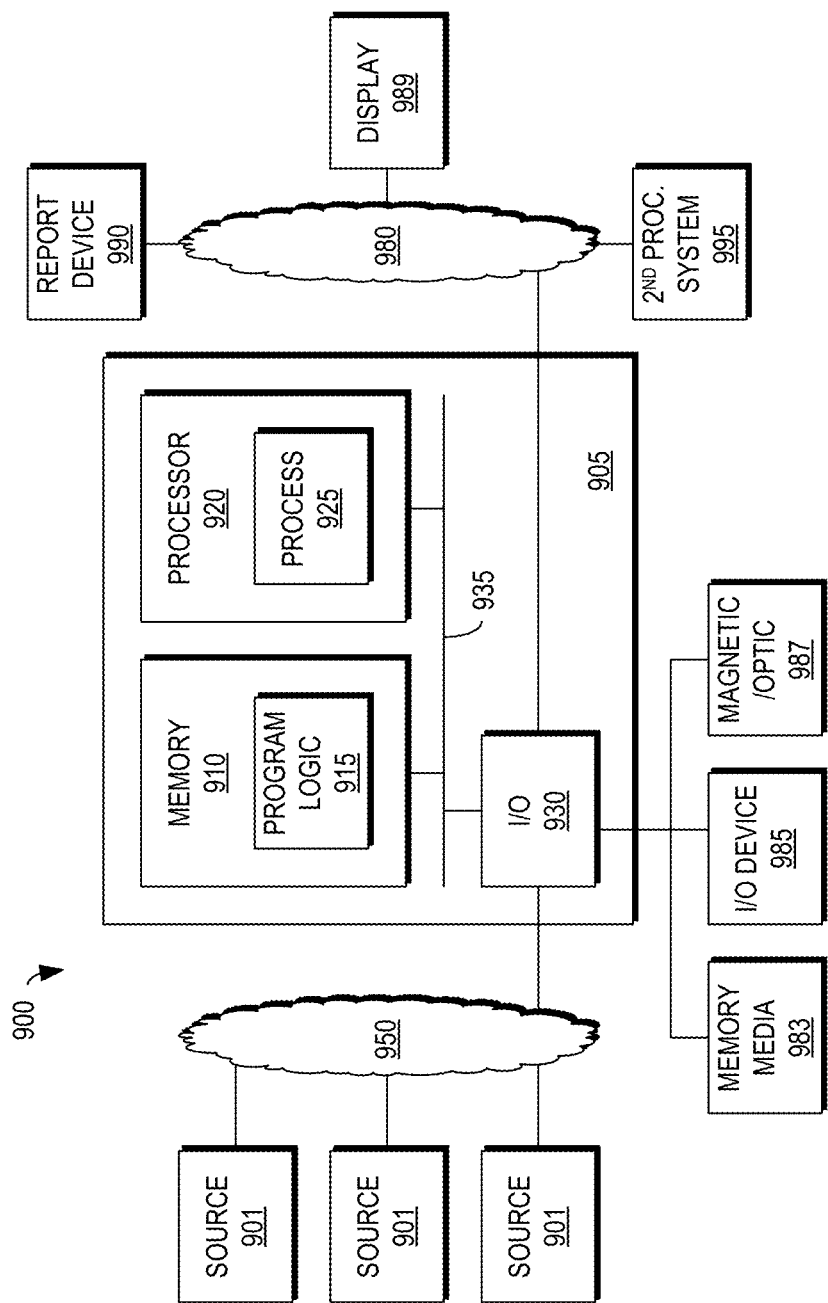
FIG. 9 is a block diagram of an example embodiment apparatus according to the present invention.

FIG. 9 is a block diagram of an example embodiment apparatus 905 according to the present invention. The apparatus 905 may be part of a system 900 and includes memory 910 storing program logic 915, a processor 920 for executing a process 925, and a communications I/O interface 930, connected via a bus 935. The communications I/O interface 930 is coupled with an input network 950, output network 980, memory media 983, I/O device 985, and magnetic/optic media 987. In the example embodiment, the input network 950 receives information from sources 901, and the output network 980 is coupled with a display 989, a report device 990, and a second processing system 995.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 9, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 10:
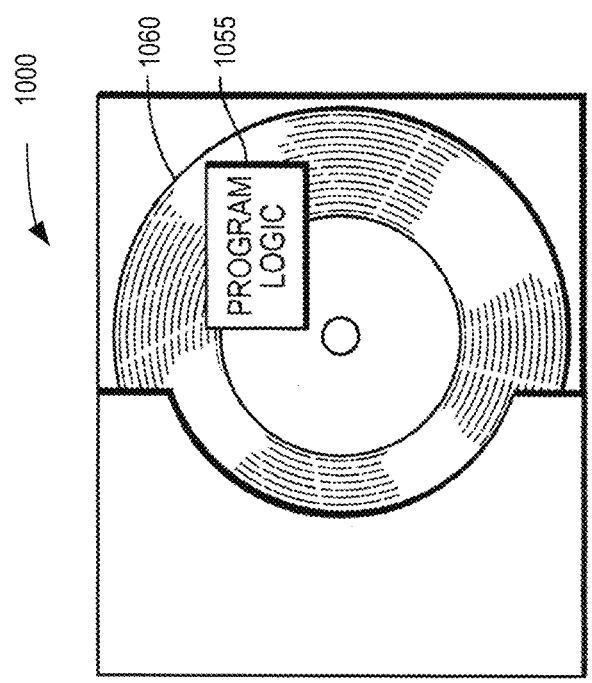
FIG. 10 is an illustration of an example embodiment of the present invention as embodied in program code.

FIG. 10 shows program logic 1055 embodied on a computer-readable medium 1060 as shown, and wherein the logic 1055 is encoded in computer-executable code configured for carrying out the methods of this invention, thereby forming a computer program product 1000.

The logic for carrying out the method may be embodied as part of the aforementioned system, which is useful for carrying out a method described with reference to embodiments shown. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method for cloud services management comprising:
  monitoring cloud services metrics for a plurality of segments of a cloud services provider;
  analyzing the cloud services metrics to identify one or more trends in one or more of the cloud services metrics; and
  providing a cloud services management application for acting on cloud services parameters for the cloud services provider according to the analyzed cloud services metrics to alter at least a given one of the identified trends for at least a given one of the cloud services metrics;
  wherein the cloud services management application comprises:
    a dashboard interface configured to display the analyzed cloud services metrics and to identify two or more of the plurality of segments of the cloud services provider to which the given trend in the given cloud services metrics is attributed;
    a project management interface configured:
      to automatically create and deploy (i) a first set of altered cloud services parameters for a first one of the identified segments of the cloud services provider and (ii) at least a second set of altered cloud services parameters for at least a second one of the identified segments of the cloud services provider;
      to monitor the cloud services metrics for the first and second identified segments of the cloud services provider for a given period of time following deployment of the first and second sets of altered cloud services parameters;
      to analyze the monitored cloud services metrics for the given period of time to identify changes in the given trend in the given cloud services metric in the first and second identified segments of the cloud services provider;
    a service administration interface configured:
      to determine a third set of altered cloud services parameters that modify one or more cloud services offered by the cloud services provider based at least in part on the identified changes in the given trend in the given cloud services metric in the first and second identified segments of the cloud services provider; and
      to deploy the third set of altered cloud services parameters to at least one of the plurality of segments of the cloud services provider to which the given trend in the given cloud services metrics is attributed.

2. The method of claim 1 wherein the cloud services management application comprises a controller pane configured for selection of content to be added to at least one of the first and second sets of altered cloud services parameters.

3. The method of claim 2 wherein the controller pane is configured for selection of content from at least one of an existing content repository and a new content creation interface.

4. The method of claim 2 wherein the content to be added comprises at least one altered service offering for cloud services provided by the cloud services provider.

5. The method of claim 1 wherein the project management interface of the cloud services management application comprises a project pane comprising an interface for defining a first project for the first set of altered cloud services parameters and a second project for the second set of altered cloud services parameters.

6. The method of claim 5 wherein the interface of the project pane is configured for selection of: (i) one or more expectations for altering the given trend in the given cloud services metrics; and (ii) one or more actions for achieving the one or more expectations.

7. The method of claim 1 wherein the service administration interface of the cloud services management application comprises a service settings pane configured for defining one or more parameters of a cloud service offering of the cloud services provider, the one or more parameters comprising at least one of a description of the cloud service offering, a location of the cloud service offering and a set of cloud services metrics to monitor for the cloud service offering.

8. The method of claim 1 wherein the service administration interface of the cloud services management application comprises a service administration pane configured for displaying and editing one or more terms of service for cloud service offerings deployed in respective segments of the cloud services provider.

9. The method of claim 1 wherein the cloud services management application comprises a customer pane configured for managing customers of the cloud services provider in the plurality of segments.

10. The method of claim 1 the cloud services management application comprises a service revenue pane configured for monitoring revenue for one or more selected one of the plurality of segments of the cloud services provider.

11. The method of claim 1 wherein the identified changes in the given identified trend in the given cloud services metric in the first identified segment are favorable and the third set of altered cloud services metrics comprise the first set of altered cloud services metrics.

12. The method of claim 11 wherein deploying the third set of altered cloud services metrics comprises deploying the first set of altered cloud services metrics in the second identified segment.

13. The method of claim 11 wherein deploying the third set of altered cloud services metrics comprises deploying the first set of altered cloud services metrics in at least one segment other than the first identified segment.

14. The method of claim 1 wherein deploying the third set of altered cloud services parameters comprises modifying an existing backend environment of the cloud services provider used to provision at least one cloud service.

15. The method of claim 1 wherein deploying the third set of altered cloud services parameters comprises creating a new backend environment on the cloud services provider for provisioning at least one cloud service.

16. The method of claim 1 wherein deploying the third set of altered cloud services parameters comprises defining at least one new cloud service for the cloud services provider.

17. An apparatus for cloud services management comprising:
  at least one processing device comprising a processor coupled to a memory;
  the at least one processing device being configured:
    to monitor cloud services metrics for a plurality of segments of a cloud services provider;
    to analyze the cloud services metrics to identify one or more trends in one or more of the cloud services metrics; and
    to provide a cloud services management application for acting on cloud services parameters for the cloud services provider according to the analyzed cloud services metrics to alter at least a given one of the identified trends for at least a given one of the cloud services metrics
  wherein the cloud services management application comprises:
    a dashboard interface configured to display the analyzed cloud services metrics and to identify two or more of the plurality of segments of the cloud services provider to which the given trend in the given cloud services metrics is attributed;
    a project management interface configured:
      to automatically create and deploy a first set of altered cloud services parameters for a first one of the identified segments of the cloud services provider and (ii) at least a second set of altered cloud services parameters for at least a second one of the identified segments of the cloud services provider;
      to monitor the cloud services metrics for the first and second identified segments of the cloud services provider for a given period of time following deployment of the first and second sets of altered cloud services parameters;
      to analyze the monitored cloud services metrics for the given period of time to identify changes in the given trend in the given cloud services metric in the first and second identified segments of the cloud services provider;
    a service administration interface configured:
      to determine a third set of altered cloud services parameters that modify one or more cloud services offered by the cloud services provider based at least in part on the identified changes in the given trend in the given cloud services metric in the first and second identified segments of the cloud services provider; and
      to deploy the third set of altered cloud services parameters to at least one of the plurality of segments of the cloud services provider to which the given trend in the given cloud services metrics is attributed.

18. The apparatus of claim 17 wherein the identified changes in the given identified trend in the given cloud services metric in the first identified segment are favorable, the third set of altered cloud services metrics comprise the first set of altered cloud services metrics, and deploying the third set of altered cloud services metrics comprises deploying the first set of altered cloud services metrics in at least one segment other than the first identified segment.

19. A computer program product comprising including a non-transitory computer readable storage medium encoded with computer executable code thereon that, when executed on a processor of a computer, causes the computer to:
  monitor cloud services metrics for a plurality of segments of a cloud services provider;
  analyze the cloud services metrics to identify one or more trends in one or more of the cloud services metrics; and
  providing a cloud services management application for acting on cloud services parameters for the cloud services provider according to the analyzed cloud services metrics to alter at least a given one of the identified trends for at least a given one of the cloud services metrics by utilizing a cloud services management application:
  wherein the cloud services management application comprises:
    a dashboard interface configured to display the analyzed cloud services metrics and to identify two or more of the plurality of segments of the cloud services provider to which the given trend in the given cloud services metrics is attributed;
    a project management interface configured:
      to automatically create and deploy a first set of altered cloud services parameters for a first one of the identified segments of the cloud services provider and (ii) at least a second set of altered cloud services parameters for at least a second one of the identified segments of the cloud services provider;
      to monitor the cloud services metrics for the first and second identified segments of the cloud services provider for a given period of time following deployment of the first and second sets of altered cloud services parameters;

to analyze the monitored cloud services metrics for the given period of time to identify changes in the given trend in the given cloud services metric in the first and second identified segments of the cloud services provider;

a service administration interface configured:

to determine a third set of altered cloud services parameters that modify one or more cloud services offered by the cloud services provider based at least in part on the identified changes in the given trend in the given cloud services metric in the first and second identified segments of the cloud services provider; and to deploy the third set of altered cloud services parameters to at least one of the plurality of segments of the cloud services provider to which the given trend in the given cloud services metrics is attributed.

20. The computer program product of claim 19 wherein the identified changes in the given identified trend in the given cloud services metric in the first segment are favorable, the third set of altered cloud services metrics comprise the first set of altered cloud services metrics, and deploying the third set of altered cloud services metrics comprises deploying the first set of altered cloud services metrics in at least one segment other than the first identified segment.

* * * * *